Patented July 18, 1933

1,919,145

UNITED STATES PATENT OFFICE

ROBERT CALVERT, OF WILMETTE, ILLINOIS, ASSIGNOR TO VAN SCHAACK BROS. CHEMICAL WORKS, INC., OF CHICAGO, ILLINOIS, A CORPORATION OF ILLINOIS

DENATURED ALCOHOL COMPOSITION

No Drawing. Application filed December 23, 1929. Serial No. 416,220.

This invention relates to a denatured alcohol composition comprising ethyl alcohol and another alcohol of approximately the same boiling point. More specifically, the invention relates to a non-potable composition of ethyl alcohol with tertiary butanol.

The properties desired in a denaturant for alcohol are well known. The denaturant should not be readily separable from the alcohol, as by extraction or fractionation, and should not introduce properties which are undesirable in the uses for which the alcohol is intended. A satisfactory denaturant would be one of solubility in water and of boiling point much like that of ethyl alcohol, of properties so similar to those of ethyl alcohol as not to interfere with its uses in a great variety of industries, and yet of such physiological action as to prevent drinking of the alcohol containing the denaturant.

This combination of properties I have found to be possessed in a remarkable degree by tertiary butanol. Tertiary butyl alcohol is not suitable for drinking. It has many properties, especially solvent properties, so much like those of ethyl alcohol that its presence in alcohol is not objectionable for many industrial uses. Like ethyl alcohol, tertiary butanol is completely miscible with water in all proportions. Finally, the separation of tertiary butanol from ethyl alcohol by distillation is not easy, since the boiling point of tertiary butanol at atmospheric temperature is 82.8° C., or only 4.3° C. above that of ethyl alcohol. Furthermore, the boiling points of tertiary butanol and ethyl alcohol are brought still closer together if water is present. The azeotropic mixture of water and alcohol has the boiling point 78.15° C., whereas the azeotropic mixture of water and tertiary butanol boils at 79.91° C.

For this reason, I may denature alcohol with tertiary butanol in the presence of water. For example, I may add to an alcohol-water solution, corresponding approximately to the azeotropic mixture, a tertiary butanol and water solution which corresponds approximately to their azeotropic mixture.

Proportions may be varied within wide limits. Thus I may use 5 to 60 parts, say 20 parts of tertiary butanol to one hundred parts of ethyl alcohol, suitably in the presence of sufficient water to form the azeotropic mixtures.

Other substances may be added, as, for example, one of the denaturants such as benzol, wood alcohol, acetone, gasoline or other petroleum products, and/or oxidized petroleum distillate.

I claim:—

1. A denatured alcohol composition comprising hydrous ethyl alcohol and tertiary butanol.

2. A composition of matter comprising ethyl alcohol, tertiary butanol, and water, the proportion of water present being approximately that required to form azeotropic mixtures with the alcohols.

3. A denatured alcohol composition comprising hydrous ethyl alcohol and 5 to 60% of its weight of tertiary butanol.

4. A denatured alcohol composition comprising hydrous ethyl alcohol and approximately 20% of its weight of tertiary butanol.

5. A denatured alcohol composition comprising ethyl alcohol and 5 to 60% of its weight of tertiary butanol.

6. A denatured alcohol composition comprising ethyl alcohol and approximately 20% of its weight of tertiary butanol.

ROBERT CALVERT.